United States Patent [19]

Amrhein et al.

[11] 4,270,945

[45] Jun. 2, 1981

[54] METHOD OF MELTING FLAT GLASS USING NITRATES TO SUPPRESS SULFUROUS EMISSIONS

[75] Inventors: Alan G. Amrhein, Fresno, Calif.; Joseph J. Hammel, O'Hara Township, Allegheny County; Larry J. Shelestak, Bairdford, both of Pa.

[73] Assignee: PPG Industries, Inc., Pittsburgh, Pa.

[21] Appl. No.: 99,276

[22] Filed: Dec. 3, 1979

[51] Int. Cl.³ .................... C03B 1/00; C03B 18/02
[52] U.S. Cl. .................... 65/99 A; 65/134; 106/52; 106/DIG. 8
[58] Field of Search ............ 65/134, 135, 136, 99 A; 106/DIG. 8, 52

[56] References Cited

U.S. PATENT DOCUMENTS

| Re. 25,312 | 1/1963 | Duncan et al. ............... 106/52 |
| 1,277,493 | 9/1918 | Sherwood ..................... 106/52 |
| 1,488,914 | 4/1924 | Gelstharp . | |
| 1,536,919 | 5/1925 | Parkinson . | |
| 1,543,770 | 6/1925 | Hilbert . | |
| 2,366,473 | 2/1945 | Blair ........................... 106/52 |
| 3,203,816 | 8/1965 | Bull et al. ..................... 106/54 |
| 3,296,004 | 1/1967 | Duncan ......................... 106/52 |
| 3,788,832 | 1/1974 | Nesbitt et al. ................. 65/134 |
| 3,880,639 | 4/1975 | Bodner et al. ................. 65/134 |
| 3,925,052 | 12/1975 | Hummel ..................... 65/99 A |
| 3,941,574 | 3/1976 | Melkonian et al. ............ 106/52 X |
| 3,954,656 | 5/1976 | Deeg et al. ................. 106/52 X |
| 4,054,434 | 10/1977 | Thomas et al. ............... 65/134 X |
| 4,138,235 | 2/1979 | Turner ........................ 65/27 |

OTHER PUBLICATIONS

*Symposium On Glass Making–Melting and Forming,* Madrid, Sep. 11-14, 1973, pp. 53-73, Higginbotham et al., "Factors Affecting the Retention of Sulfur in the Melting of Flint Glass."

"Volatilization of Sulfate from Soda-Lime-Silica Glass", E. Preston et al., *Journal of the Society of Glass Technology,* vol. 20, 1936, pp. 127-138.

"Behavior of Sulfur in Silicate and Aluminate Melts", J. B. Fincham et al., *Proceedings of the Royal Society of London,* Series A, vol. 223, 1954, pp. 40-62.

*Primary Examiner*—Arthur D. Kellogg
*Attorney, Agent, or Firm*—Dennis G. Millman

[57] ABSTRACT

Sulfurous emissions from a glass melting furnace are suppressed by including a nitrate oxidizing agent in the raw materials being fed into the furnace.

10 Claims, 2 Drawing Figures

METHOD OF MELTING FLAT GLASS USING NITRATES TO SUPPRESS SULFUROUS EMISSIONS

BACKGROUND OF THE INVENTION

The present invention relates to the reduction of sulfur-containing emissions (e.g., $SO_2$ and $SO_3$ gases, particulate sulfates, and $H_2SO_4$ mist) from a large scale, continuous, flat glass melting operation. The term flat glass refers to glass commercially produced by the float process, plate rolling and grinding, and sheet drawing. Flat glass generally conforms to a relatively narrow composition range as follows:

$SiO_2$: 69–75% by weight
$Na_2O$: 12–16% by weight
$K_2O$: 0–2% by weight
$CaO$: 8–12% by weight
$MgO$: 2–5% by weight
$Al_2O_3$: 0–2% by weight
$SO_3$: 0.1–0.5% by weight
$Fe_2O_3$: 0–0.7% by weight Commercial production of flat glass conventionally involves feeding raw glass batch materials into an opening at one end of an elongated melting furnace while withdrawing melted glass through an opening at the opposite end of the furnace and forming it into a continuous flat ribbon. Flat glass batches typically include sand (silica), soda ash (sodium carbonate), limestone (calcium carbonate), dolomite (calcium carbonate and magnesium carbonate), rouge (iron oxide), a source of sulfur such as salt cake, gypsum, slag, etc., and sometimes the raw materials aplite, feldspar, or nepheline syenite. It is also known to use caustic soda in place of soda ash. Minor amounts of additional materials such as colorants may sometimes be used as well, although the present invention relates primarily to glasses in which the sole essential colorant, if any, is iron. These batch ingredients, in finely divided, dry, particulate form, are blended together and usually wetted with water (or caustic soda solution) prior to being introduced into the furnace. Additionally, a substantial amount of cullet (crushed glass) is mixed with the batch ingredients, in amounts usually ranging from about 20% to about 60% of the total glassmaking materials being fed to the furnace.

When introduced to the high temperature conditions within the melting furnace, the raw ingredients undergo chemical reactions and dissolution which, in a continuous flat glass furnace, normally take place within the first half of the furnace or less. The remainder of the furnace is devoted to "fining" (or "refining") and conditioning the glass melt. The process of fining is the removal of gaseous products of reaction from the melt by providing conditions which cause the gas bubbles to rise to the surface and burst or to redissolve in the glass. In a continuous glassmaking operation it is very important that conditions be maintained to enable fining of each portion of the melt to take place within its limited residence time in the fining zone of the furnace. Any gaseous inclusions which are carried out in the product stream form the defects known as "bubbles" (those having diameters larger than 0.25 mm.) or "seeds" (those having diameters smaller than 0.25 mm.) in the glass.

The problem of obtaining adequate fining is especially acute in a flat glassmaking operation since the standards for bubbles and seeds for flat glass are much more stringent than other types of glass such as bottle glass. For example, flat glass having one seed per square foot (0.09 square meter) would be considered rejectable for most flat glass applications, whereas what would be regarded as a very good grade of bottle glass may have on the order of 500 seeds per square foot (0.09 square meter) if formed into a sheet of the same thickness. In order to obtain adequate fining within a reasonable length of furnace, the flat glass industry has heretofore relied on the inclusion of substantial amounts of a sulfur source, usually salt cake (sodium sulfate), together with a carbon source, usually coal, in the batch as fining agents. The salt cake reacts to form substantial volumes of gas, thereby causing gaseous inclusions to grow, which accelerates the movement of bubbles and seeds to the surface of the melt and helps to homogenize the glass. Thus, it has long been the standard practice in the commercial production of flat glass to include substantial amounts of salt cake and coal or their equivalents in the batch ingredients fed to continuous melting furnaces.

Unfortunately, the use of sulfur compounds as fining agents has serious drawbacks. At glass melting temperatures sulfur compounds such as salt cake dissociate or volatilize, resulting in the emission of sulfur-containing gases. These may recombine with water vapor or sodium vapor within the furnace or exhaust passages to form sulfuric acid mist or particulate sodium sulfate, which are not only air pollutants, but have a detrimental effect on the refractory checker-packing in the regenerators of the furnace. Many widely varying proposals for reducing sulfur-containing emissions have been made in the prior art, but none is entirely satisfactory.

One commonly proposed solution is to treat the effluent gas stream to remove the sulfur compounds. However, such as approach is costly and does not reduce the detrimental effects of the emissions on the regenerators. U.S. Pat. Nos. 3,788,832 and 3,880,639 disclose examples of the recovery and recycling of sulfur compounds from the exhaust gas stream by contacting the exhaust gas with incoming batch materials.

Accordingly, attempts have been made to reduce the amount of sulfur compounds used in the melting process as exemplified by U.S. Pat. No. 4,138,235. It would be desirable to reduce sulfurous emissions even further, but reducing the amount of salt cake or other sulfurous fining agents can adversely affect the melting process. Other attempts to reduce or eliminate sulfur from glass melting tanks have utilized alternate fining agents, but none of these has gained acceptance in the flat glass industry due to unfavorable cost and/or effectiveness relative to salt cake and because some undesirably introduce extraneous ions into the product glass. Some proposed substitute fining agents, such as fluorine compounds, present at least as great an emissions problem as sulfur compounds. It has also been proposed that supplemental operations intended to assist melting, such as agglomerating and/or prereacting the batch materials, may result in lower fining agent requirements, but such an additional operation requires substantial capital investment and increased operating costs, and the predicted improvements have not always been obtained in commercial practice.

Practical limits have existed on outright reduction of sulfur being fed to a glass melting furnace because, in order to provide for adequate fining, excess sulfur must be supplied to compensate for volatile losses in early stages of the melting process upstream from where fining takes place. Also, secondary benefits of sulfur to the melting process would suffer from excessive reduction. These secondary melting effects include: enhancement of runoff from the unmelted batch layer, dispersion of sand grains thereby speeding their dissolution, control of foaming, and prevention of "silica scum" on the surface of the pool of molten glass. These effects are primarily liquid phase effects which require the sulfur to be present in the molten glass during early stages of melting. Thus it has been considered important to provide sufficient sulfur source in the batch to provide an ample concentration of sulfur in the melt early in the melting process.

Reduced amounts of salt cake are employed in the manufacture of one type of flat glass: colored glasses which incorporate selenium, cobalt, and nickel oxides, such as those disclosed in U.S. Pat. Nos. 3,296,004 and Re. 25,312. In glasses of this particular type, development of the desired coloration requires that oxidizing conditions be maintained and, therefore, salt cake and coal are partially replaced by oxidizing agents such as sodium nitrate or sodium chloride. The present invention, on the other hand, deals only with glasses which may be categorized as clear, or which contain iron oxide as the essential colorant. Since the oxidizing conditions required in the melting of the selenium, cobalt, and nickel colored glasses are not required for conventional clear and iron tinted glass, the use of such oxidizing agents has generally been limited to the colored specialty glasses.

Other ways of reducing sulfur-containing emissions may be apparent to those of skill in the art, but each has serious drawbacks. For example, volatilization of salt cake may be reduced by lowering the melting furnace temperature, but the output of the furnace would be reduced and completeness of melting may suffer. Another possibility would be to reduce the amount of salt cake employed and compensate by increasing furnace temperatures. But the result would be shorter furnace life and greater fuel consumption. Yet another approach would be to increase the relative amount of cullet charged to the furnace along with the batch materials. This latter approach has been considered by some in the glass industry to be best solution to the emissions problem as evidenced by a report in *Business Week*, Mar. 31, 1976, pp. 66B, 66H. But reliance on large amounts of cullet is preferably avoided because adequate supplies of suitable cullet are not always available in the flat glass industry, and excessive use of cullet represents inefficient utilization of a flat glass melting furnace in that more fuel is consumed to yield a net amount of product glass. Thus, it would be desirable if sulfur-containing emissions could be reduced without altering the usual temperature conditions in a melting furnace, while at the same time using a relatively high batch-to-cullet ratio.

SUMMARY OF THE INVENTION

The present invention provides a method for operating a continuous flat glass melting furnace with reduced amounts of salt cake (or other sulfur source) and lower sulfurous emissions, without sacrificing fining ability or melting aid effects, without adding extraneous ions to the glass, while operating at normal furnace temperatures, throughputs, and batch-to-cullet ratios.

The advantages of the invention result from the discovery that including an oxidizing agent in the batch being fed to a glass melting furnace supresses wasteful, premature volatilization of sulfur-containing melting and fining aids in the early stages of melting. More of the sulfur is incorporated into the melt at an early stage, where it functions usefully as a melting aid and, later on, as a fining agent. Since less sulfur is wasted, less need be fed to the furnace to yield the same degree of benefit when an oxidizing agent is employed in accordance with the invention. Expressed another way, less volatile loss from a given amount of sulfur addition occurs when the oxidizing agent of the invention is employed.

The oxidizing agents employed in the invention are inorganic nitrate salts, particularly sodium nitrate, calcium nitrate, and magnesium nitrate because they introduce no ions foreign to standard flat glass compositions. Potassium nitrate is another suitable oxidizing agent, provided enough can be included in the batch without exceeding the usual limits for potassium in the final glass product. The preferred oxidizing agent is sodium nitrate due to its commercial availability and the ease with which sodium can be incorporated into a flat glass batch formula.

The amount of oxidizing agent required will vary, depending upon the specific process parameters of a particular furnace, a perceivable effect generally being obtainable with about 0.1 percent by weight of the dry batch constituting nitrate salt. No operational upper limit has been ascertained, but above about 3 percent by weight nitrate in the batch the additional improvement is generally insufficient to justify the added cost.

Adding nitrate oxidizing agent to the batch has been found to yield greater sulfur retention in the product glass stream, and as a result, satisfactory melting and fining can be attained with sulfur input rates no more than 1.4 (preferably less than 1.2) times the output rate of sulfur in the glass. This means that a smaller percentage of the sulfur input escapes as gaseous effluent, and since the sulfur input itself may be lowered, a significant reduction in sulfur-containing gaseous effluents can be achieved.

Since the invention requires the addition of an oxidizing agent to the batch, the batch should be essentially free from reducing agents such as carbon sources, including coal and other organic materials.

Another optional feature of the present invention is that the inclusion of an oxidizing agent in the batch materials may permit the need for an oxidizing atmosphere in a glass melting furnace to be relaxed, which in turn permits operating furnace combustion burners at a low air/fuel ratio, which suppresses the formation of $NO_x$ pollutants in the exhaust gas stream.

THE DRAWINGS

DETAILED DESCRIPTION

Efforts in the glass industry in recent years to minimize the use of sulfur in the glass melting process have been motivated by the desire to reduce particulate emissions from glassmaking plants and the knowledge that the major portion of particulate emissions comprise sulfates. This invention is in furtherance of those efforts, but the benefits extent to reducing all forms of sulfur-containing emissions as well as particulates.

Figure 1:
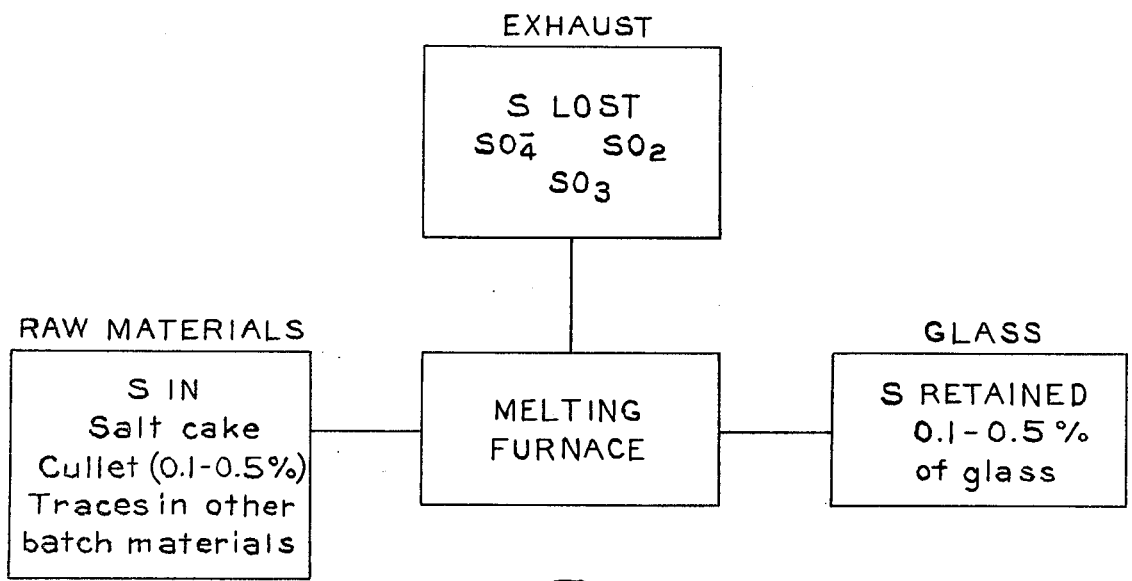
FIG. 1 is a schematic diagram representing the sulfur material balance in a glass melting operation.

A material balance on sulfur for a glass melting operation is shown schematically in FIG. 1. Each box indicates the forms in which sulfur is present in the input stream and the two output streams. The general object of the invention may be said to be shifting the sulfur output from the exhaust stream to the glass stream; or, when sulfur input is reduced, forcing the sulfur output reduction to come predominately from the exhaust stream rather than the glass stream. Another possible input source of sulfur not included in FIG. 1 is the sulfur content of the fuel burned in the furnace. This may not be a significant factor in furnaces burning natural gas, but it may be significant when the fuel is oil. However, in either case, it may be assumed that essentially all of the sulfur in the fuel leaves in the exhaust stream and has essentially no effect on the sulfur retained in the glass. Therefore, sulfur content of the fuel would appear to be a problem separate from that addressed by the present invention and has been disregarded herein.

The chief approach to reducing sulfate emissions has heretofore involved reducing the amount of salt cake included in the glass batch materials to a mere fraction of that considered necessary as little as a decade ago. Further salt cake reductions have been found to be difficult to achieve without negatively affecting furnace operation and glass quality. It has been observed that reductions in salt cake at the former high levels had relatively little effect on the final $SO_3$ content of the glass, but at today's reduced salt cake levels, further reductions can affect the final $SO_3$ content significantly. This lowering of the $SO_3$ content of the glass appears to correlate to melting deficiencies. This effect can be seen in Table 1, where each of the trials constitutes the operating conditions of a commercial flat glass melting furnace producing about 420 tons (382 metric tons) per day. In trials 1 through 7 salt cake was reduced progressively but no nitrate was added, and it can be seen that the amount of sulfur (measured as $SO_3$) retained in the glass decreased. However, under conditions like those in trials 1 through 7, a sulfur material balance calculation reveals that about thirty percent of the sulfur still escapes into the atmosphere in the furnace even at the relatively low salt cake levels.

Sampling emissions at various locations within the furnace shows that most of the sulfur loss occurs in the upstream portion of the furnace where melting is in its early stages. This is confirmed by the laboratory data shown in Table II. Each melt in Table II was a 50 gram sample melted in a crucible at 2600° F. (1427° C.) in a 5 percent oxygen atmosphere for the designated time. The samples had the following batch formula, which closely corresponded to preferred commercial flat glass batch formulas:

| Ingredient | Parts by Weight |
|---|---|
| Sand | 1000 |
| Soda ash | 318 |
| Limestone | 84 |
| Dolomite | 242 |
| Salt cake | 7.8 |
| Rouge | 0.8 |

Figure 2:
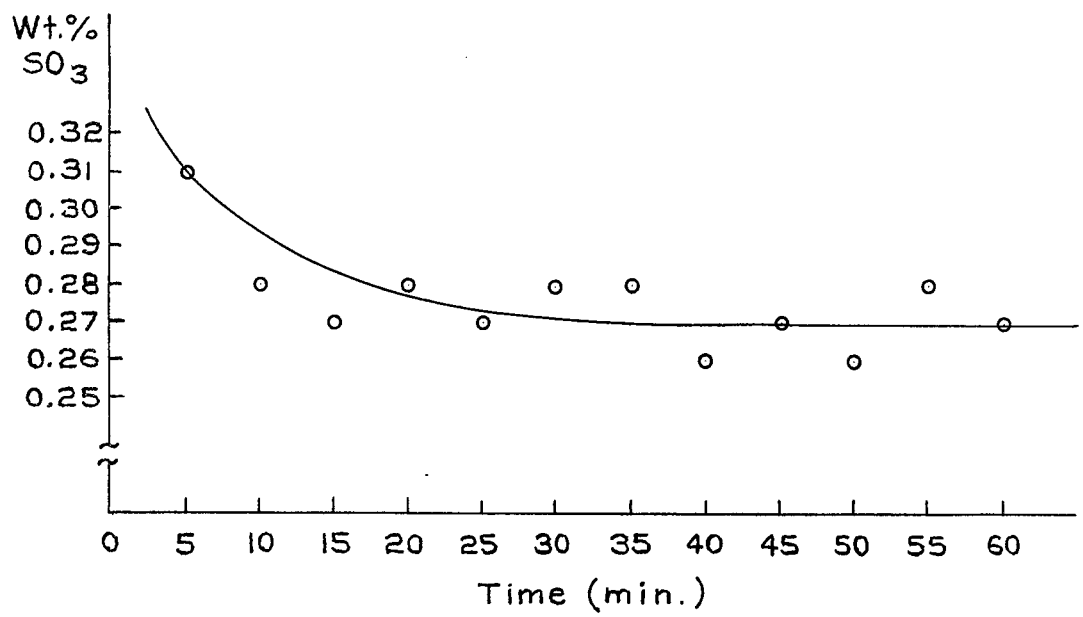
FIG. 2 is a plot of $SO_3$ content of glass versus melting time, which depicts the experimental results set forth in Table II hereinbelow.

It can be observed in Table II that essentially all of the volatile loss of sulfur occurred within the first ten minutes and that thereafter very little loss occurred. These results are depicted graphically in FIG. 2.

The beneficial effect of the preferred oxidizing agent, sodium nitrate, on sulfur retention may be seen in Tables III and IV. The melts in Table III were carried out in the same manner as those in Table II with the exception that all were carried out for a period of 15 minutes. Melts 1 through 7 in Table III include no nitrate and show a retained $SO_3$ content averaging 0.281 percent by weight. Melts 8, 9 and 10 include 1, 3, and 7 percent nitrate, respectively, which was substituted in the batch formula for an equivalent amount of soda ash to provide a uniform sodium input. Melt 8 shows a slight increase in $SO_3$ retained of marginal significance, and Melts 9 and 10 show substantial increases in $SO_3$ retention.

In Table IV the data show the results of a modified technique for carrying out crucible melts which is believed to more closely simulate conditions in a large scale glass melting furnace. The batch had the following composition:

| Ingredient | Parts by weight |
|---|---|
| Sand | 1000 |
| Soda ash | 274.75 |
| Limestone | 87 |
| Dolomite | 235.7 |
| Salt cake | 7.8 |
| Caustic soda (50% aqueous solution) | 69.3 |
| Rouge | 0.72 |

This batch is considered "dry" for the purposes of calculations herein despite the inclusion of caustic soda solution. In addition to the batch, each of the 50 gram crucibles included 32.5% by weight cullet having the following composition:

| Component | Percent by weight |
|---|---|
| $SiO_2$ | 73.09 |
| $Na_2O$ | 13.73 |
| $K_2O$ | 0.02 |
| CaO | 8.82 |
| MgO | 3.93 |
| $Al_2O_3$ | 0.11 |
| $SO_3$ | 0.23 |
| $Fe_2O_3$ | 0.07 |

This composition is essentially standard, commercial, clear float glass. The same 15 minute period at 2600° F. (1427° C.) was used but with an atmosphere of only 3% oxygen. Although smaller nitrate additions were made than in the melts of Table III, more in line with economic feasibility on a production scale, Table IV shows a more dramatic improvement in sulfur retention in the nitrate containing melts 8, 9, and 10.

The addition of a nitrate oxidizing agent does not appear to be effective at relatively high salt cake levels as have been used in the prior art. Another series of crucible melts containing 15 parts by weight salt cake is reported in Table V. The additional salt cake replaced a portion of soda ash, and the melting procedure was the same as that in the melts of Table IV described above. In the trials with high salt cake, the nitrate additions showed no measurable effect on sulfur retention.

TABLE I

| Trial No. | Salt cake, parts per 1000 parts sand (weight) | Parts NaNO3 per 1000 parts sand (weight) | Number of Readings | Time span (days) | SO3 in glass (average) (wt. percent) | SO3 in/SO3 out weight ratio |
| --- | --- | --- | --- | --- | --- | --- |
| 1. | 9.1 | 0 | 2 | 7 | 0.24 | 1.38 |
| 2. | 8.8 | 0 | 1 | 1 | 0.23 | 1.42 |
| 3. | 8.5 | 0 | 2 | 12 | 0.235 | 1.37 |
| 4. | 8.1 | 0 | 1 | 1 | 0.23 | 1.37 |
| 5. | 7.8 | 0 | 18 | 203 | 0.226 | 1.30 |
| 6. | 7.6 | 0 | 1 | 1 | 0.22 | 1.37 |
| 7. | 7.3 | 0 | 5 | 29 | 0.208 | 1.43 |
| 8. | 7.29 | 4 | 1 | 1 | 0.21 | 1.36 |
| 9. | 7.0 | 4 | 1 | 1 | 0.21 | 1.32 |
| 10. | 6.7 | 8 | 2 | 8 | 0.21 | 1.28 |
| 11. | 6.4 | 8 | 2 | 5 | 0.205 | 1.24 |
| 12. | 6.0 | 8 | 2 | 7 | 0.205 | 1.20 |
| 13. | 6.0 | 12 | 2 | 4 | 0.210 | 1.16 |
| 14. | 6.0 | 16 | 2 | 8 | 0.212 | 1.20 |
| 15. | 5.7 | 16 | 5 | 29 | 0.214 | 1.13 |

TABLE II

| Melt No. | Time (min.) | SO3 (wt. %) | % Sulfur Retained |
| --- | --- | --- | --- |
| 1. | 5 | 0.31 | 81.6 |
| 2. | 10 | 0.28 | 73.7 |
| 3. | 15 | 0.27 | 71.1 |
| 4. | 20 | 0.28 | 73.7 |
| 5. | 25 | 0.27 | 71.1 |
| 6. | 30 | 0.28 | 73.7 |
| 7. | 35 | 0.28 | 73.7 |
| 8. | 40 | 0.26 | 68.4 |
| 9. | 45 | 0.27 | 71.1 |
| 10. | 50 | 0.26 | 68.4 |
| 11. | 55 | 0.28 | 73.7 |
| 12. | 60 | 0.27 | 71.1 |

TABLE III

| Melt No. | NaNO3 (wt. % of batch) | SO3 (wt. %) | % Sulfur Retained |
| --- | --- | --- | --- |
| 1. | 0 | 0.27 | 71.1 |
| 2. | 0 | 0.27 | 71.1 |
| 3. | 0 | 0.29 | 76.3 |
| 4. | 0 | 0.30 | 78.9 |
| 5. | 0 | 0.29 | 76.3 |
| 6. | 0 | 0.28 | 73.7 |
| 7. | 0 | 0.27 | 71.1 |
| 8. | 1 | 0.29 | 76.3 |
| 9. | 3 | 0.31 | 81.6 |
| 10. | 7 | 0.33 | 86.8 |

TABLE IV

| Melt No. | NaNO3 (wt. % of batch) | SO3 (wt. %) | % Sulfur Retained |
| --- | --- | --- | --- |
| 1. | 0 | 0.26 | 81.3 |
| 2. | 0 | 0.26 | 81.3 |
| 3. | 0 | 0.26 | 81.3 |
| 4. | 0 | 0.26 | 81.3 |
| 5. | 0 | 0.25 | 78.1 |
| 6. | 0 | 0.25 | 78.1 |
| 7. | 0 | 0.25 | 78.1 |
| 8. | 0.25 | 0.27 | 84.4 |
| 9. | 0.5 | 0.28 | 87.5 |
| 10. | 1.0 | 0.29 | 90.6 |

TABLE V

| Melt No. | Parts salt cake per 1000 parts sand (weight) | NaNO3 (wt. % of batch) | SO3 (wt. %) | % Sulfur Retained |
| --- | --- | --- | --- | --- |
| 1. | 15 | 0 | 0.38 | 76 |
| 2. | 15 | 1 | 0.38 | 76 |
| 3. | 15 | 3 | 0.38 | 76 |

The effect of nitrate addition on a full-scale glass melting operation may be seen by referring again to Table I. As previously noted, the declining salt cake feed rates were accompanied by declining SO3 concentration in the glass in trials 1 through 7. Trials 8 through 15 show further decreases in salt cake, but accompanied by a progressively increasing nitrate addition, with the result that SO3 retention remains stable and in some cases even increases in comparison with trial 7 which had a higher sulfur input rate. The net effect is that with nitrate being added less sulfur escapes as an emission.

Excellent results have been obtained in full-scale melting operations at 4 to 24 parts by weight sodium nitrate to 1000 parts by weight sand, which corresponds approximately to about 0.25 to 1.5 percent by weight of the batch, but it is evident that useful results would be obtained considerably beyond both ends of that range. Extrapolating from the data in the tables above, the benefits at about 0.1 percent nitrate in the batch may be predicted to be rather minimal, but viable nevertheless. The upper limit appears to be one of economics, with predictably diminishing returns for additional nitrate beyond about 3 percent of the batch. With the nitrate oxidizing agent used in accordance with the invention, salt cake feed rates have been maintained below 10 parts by weight per 1000 parts by weight sand, frequently below 7/1000, and in optimal cases approaching 5/1000. Taking into account the total sulfur input into the furnace, the sulfur input need be no more than 1.4 (preferably less than 1.2) times the amount of sulfur being withdrawn in the product glass stream. Under these conditions final glass SO3 concentrates generally fall within the range of 0.15 to 0.25 percent by weight. At the same time, batch/cullet weight ratios of at least 70/30 may be maintained.

Weights and percentages of nitrates reported herein are based on sodium nitrate. It should be understood that when the alternative nitrate salts are referred to, the figures should be compensated for molecular weight differences.

It should be noted that the sulfur retention levels recorded herein for the small crucible melt tests (all except Table I) are somewhat higher than can be expected from a large scale, continuous, commercial melting operation. It is estimated that the percentage of sulfur retained in a large melting furnace may be on the order of about ten percentage points lower than the crucible melts. This is due to the longer residence times and higher temperature zones that an increment of glass may experience in a large melting furnace. This, of course, does not diminish the validity of the crucible melts as tests of comparative melting behavior during the early stages of melting.

One should also be aware that for all purposes herein, the calculated input rate of sulfur takes into account not only the salt cake (or sulfur-containing substitute) but also the SO3 in the cullet and traces of sulfur in other batch ingredients.

Predetermined oxidizing conditions of the atmosphere within a fuel fired glass melting furnace may be established by controlling the ratio of air to fuel being supplied to the furnace. For minimizing the production of nitrogen oxide ($NO_x$) gaseous effluent pollutants, it is desirable to maintain the air/fuel ratio as low as possible. However, the conventional requirement of generally oxidizing conditions in a flat glass furnace has been a constraint on lowering the air/fuel ratio, particularly when it is also desired to minimize the amount of salt cake in the batch. But in the present invention, the inclusion of an oxidizing agent in the batch permits more leeway as to the oxidizing state of the furnace atmosphere. Whereas conventional flat glass combustion furnaces typically employ about 3 to 4 percent excess oxygen beyond that stoichiometrically required for complete combustion, the present invention may allow a "reducing" combustion flame having incomplete combustion, which is usually attained at about 1 percent excess oxygen or less. Incomplete combustion in a glass melting furnace is evidenced by the presence of combustibles in the exhaust gas stream sampled in the vicinity of the entrance to the regenerators. Such sampling for combustibles may be performed by a combustibles detector of the catalytic type, such as Teledyne Analytical Instruments Model No. 980.

Variations and modifications as would be obvious to one of ordinary skill in the art may be resorted to without departing from the spirit and scope of the invention as defined by the following claims.

We claim:

1. In the method of melting soda-lime-silica glass wherein a pool of molten glass is maintained within an elongated furnace, and glass batch materials and cullet are fed into the furnace at one end and melted glass is withdrawn at the opposite end and formed into a flat glass ribbon, wherein sources of Si, Na, Ca, Mg, Al, and Fe in the batch and cullet are proportioned to yield a glass composition comprising, by weight:

69–75 percent $SiO_2$
   12–16 percent $Na_2O$
   0–2 percent $K_2O$
   8–12 percent CaO
   2–5 percent MgO
   0–2 percent $Al_2O_3$
   0–7 percent Fe measured as $Fe_2O_3$ as the sole essential colorant;

and the interior of the furnace is maintained at sufficient temperatures and conditions to melt and react the batch and cullet to yield said glass composition; wherein the batch and cullet also include sources of sulfur, a portion of which is retained in the glass and additionally comprises 0.10 percent to 0.5 percent by weight of the product glass composition as $SO_3$ and the remainder of which is volatilized and escapes from the pool of molten glass as gaseous products of reaction, said volatilization and escape of part of the sulfur serving as essentially the sole fining agent to reduce gaseous inclusions in the glass to no more than one seed per square foot of formed glass ribbon, the improvement comprising: determining the sulfur content of the product glass withdrawn from the furnace and accordingly controlling the input rate of sulfur in the batch and cullet being fed into the furnace to no more than 1.4 times the output rate of sulfur being withdrawn in the melted glass product stream; feeding into the furnace at a rate of at least 0.1 percent of the batch on a dry weight basis an oxidizing agent comprising an inorganic nitrate salt; and maintaining the batch and cullet feed stream essentially free from carbon and organic materials; whereby the rate of sulfur-containing emission from the furnace is reduced while maintaining the requisite fining of the glass.

2. The method of claim 1 wherein the batch includes sand and salt cake in a weight ratio no greater than 10 parts salt cake to 1000 parts sand.

3. The method of claim 1 or 2 wherein the nitrate oxidizing agent is included in the batch at a weight ratio of about 4–24 parts to 1000 parts sand in the batch.

4. The method of claim 3 wherein the oxidizing agent is sodium nitrate.

5. The method of claim 1 wherein the sulfur input rate is maintained below 1.2 times the output rate of sulfur in the melted glass being withdrawn.

6. The method of claim 1, 2, or 5 wherein the weight ratio of batch to cullet is at least 70/30.

7. The method of claim 1, 2, or 5 wherein the $SO_3$ content of the final glass composition is 0.15 to 0.25 percent by weight.

8. The method of claim 7 wherein the batch includes salt cake and sand in a weight ratio no greater than 7 parts salt cake to 1000 parts sand.

9. The method of claim 8 wherein the nitrate oxidizing agent comprises no more than 3 percent of the dry batch weight.

10. The method of claim 1 wherein melting temperatures are maintained within the furnace by means of a combustion burner operating with an oxygen/fuel ratio insufficient to provide complete combustion.

* * * * *